Figures 1, 3:
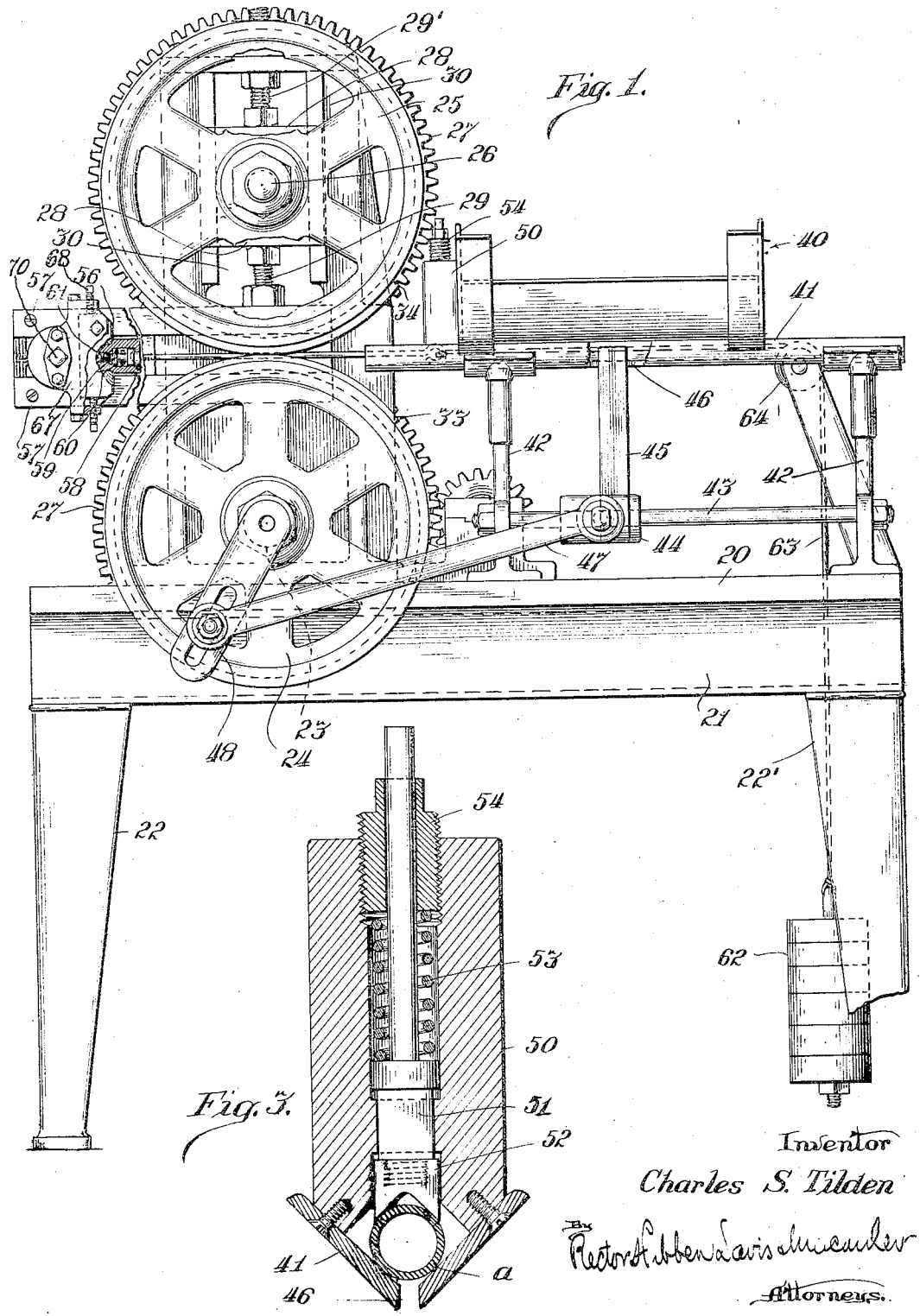

Jan. 1, 1924. 1,479,564
C. S. TILDEN
APPARATUS FOR SHAPING TUBULAR STOCK LENGTHS
Filed Oct. 9, 1920 3 Sheets-Sheet 1

Inventor
Charles S. Tilden

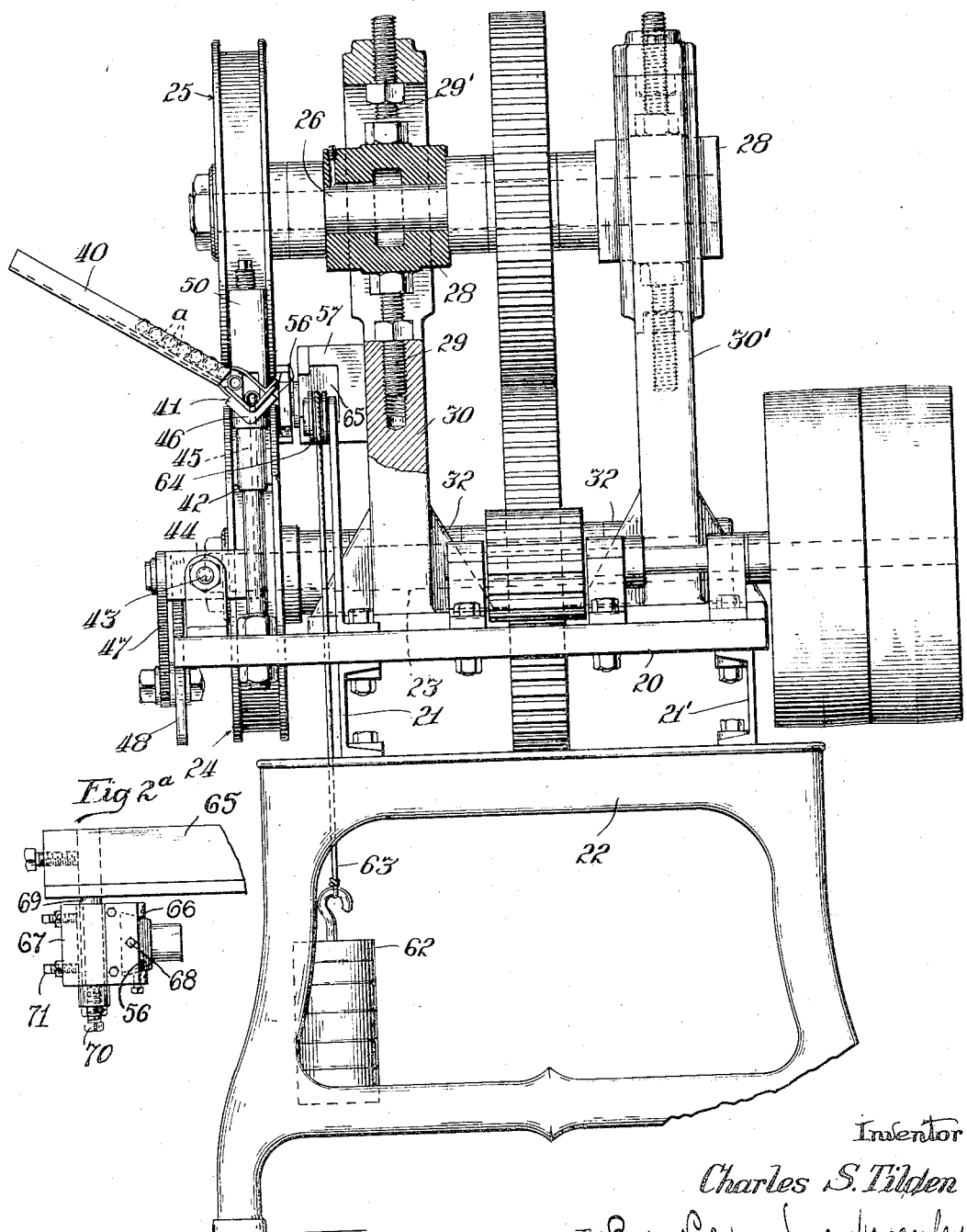

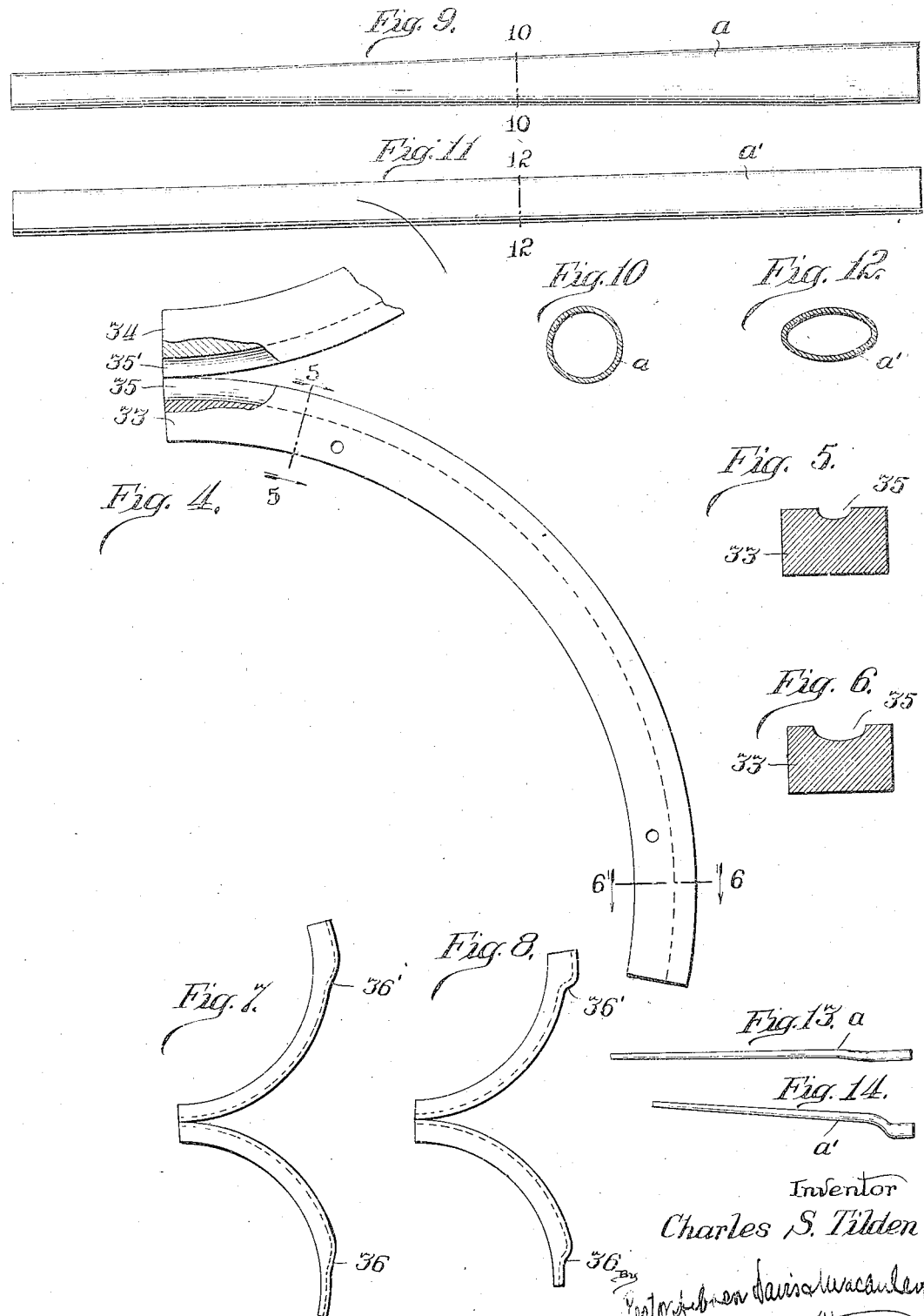

Patented Jan. 1, 1924.

1,479,564

UNITED STATES PATENT OFFICE.

CHARLES S. TILDEN, OF CLEVELAND, OHIO, ASSIGNOR TO THE ELYRIA IRON & STEEL COMPANY, OF CLEVELAND, OHIO, A CORPORATION OF OHIO.

APPARATUS FOR SHAPING TUBULAR STOCK LENGTHS.

Application filed October 9, 1920. Serial No. 415,777.

*To all whom it may concern:*

Be it known that I, CHARLES S. TILDEN, a citizen of the United States, residing at Cleveland, in the county of Cuyahoga and State of Ohio, have invented certain new and useful Improvements in Apparatus for Shaping Tubular Stock Lengths, of which the following is a specification.

My invention relates to apparatus for shaping tubular stock and has for its general object to provide an efficient, rapid and satisfactory machine for automatically acting upon cut lengths of tubular stock to change their sectional configuration, or lengthwise contour, or both. More specifically, objects of my invention are to provide rotary-die shaping instrumentalities and co-ordinated reciprocatory feeding means, adapted to take a supply of straight tapered circular-section lengths of tube stock and automatically to operate on these blanks in succession, rapidly and accurately to shape them to oval cross-section and at the same time to bend them longitudinally by die pressure. Other and further objects of my invention will become apparent from the following description taken in conjunction with the accompanying drawings wherein, by way of example and without intent to limit my invention specifically thereto, I have illustrated a machine particularly constructed for the formation of rear-fork members for bicycles, and wherein:

Fig. 1 is a side elevation of the machine; Fig. 2 is an elevation from the right or feeding end; Fig. 2ª is a plan detail of a guide-structure; Fig 3 is a detail of a centering device; Fig. 4 is a detail, in side elevation, of ovaling dies; Figs. 5 and 6 show sections on lines 5—5 and 6—6 respectively of Fig. 4; Figs. 7 and 8 are reduced views of modified lateral-bending dies; Figs. 9 and 10 illustrate in elevation and section, respectively, a tapered stock-length; Figs. 11 and 12 similarly show a straight oval product formed on the machine, such as may be produced by the dies shown in Fig. 4; and Figs. 13 and 14 show finished tube lengths ovaled and laterally bent as for bicycle fork purposes, and as may be respectively produced by dies as shown in Figs. 7 and 8.

The table top or plate 20, supported on beams 21, 21' that rest on standards 22, 22', carries at one end the rotary power-driven die-couple, these being driven from a cross-shaft 23 having suitable pulleys or other power receptive connections at one end. At the other end of the table is a reciprocating feed mechanism, the reciprocating element of which is also driven from the shaft 23, ensuring synchronism between the two major sections of the machine. A carrier-wheel 24 for the lower die shoe is mounted directly on the shaft 23, and a companion wheel 25 directly above it has its transverse shaft 26 driven by one-to-one gearing 27 from the shaft 23. The upper shaft 26 is supported in bearing hangers 28 that are vertically adjustable in suitable fashion, as by screws 29, 29', in vertical standards 30, 30', these standards also affording the fixed bearing 32 for the drive shaft 23.

The die shoes 33 and 34, detachably bolted to the carrier wheel rim, are of arcuate curvature in general and are complementally grooved to form between them the die-pass. In the particular construction shown, intended for working on tapered blanks, the groove in each die tapers in semi-oval sections, as indicated at 35, 35', with the small ends of the groove in leading position with respect to the counter-clockwise direction of rotation of the drive shaft 23. Of course I do not confine my invention to dies of this particular shape, and the dies may also be given complemental off-sets 36, 36', in radial direction, as shown in Figs. 7 and 8, for offsetting corresponding portions of the tube lengths.

The automatic feed includes a stock-rack or magazine 40, in the form of an inclined, end-flanged plate down which the round tapered tubular blanks *a* may roll to a V-shaped guide-trough 41 that extends beyond the magazine to a point conveniently close to the operating area of the die, and in direct alignment with the die-pass. The stock-rack and guide-trough are carried by a stout frame 42 mounted on the table and upon which is secured a longitudinal bar or rail 43 for a slide block 44 from which a feed-arm 45 extends upwardly and passes through a slot 46 in the bottom of the trough 41. When reciprocated this feed-arm may select and feed forward the lowest stock blank in the magazine, the range of its reciprocation carrying it beyond the end of the magazine that is most remote from the dies. The slide block 44 has pitman connection 47 to a slotted crank 48 on the main shaft, so that by adjusting the wrist of the pitman in the crank slot the throw of the feed-arm may be varied. It is desirable in practice so to time the parts and adjust the pitman connection that the feed arm presses the end of the blank into the die-pass just before the crank 48 passes dead-center, thus to avoid jarring of the mechanism and possible jamming and mutilation of the blank.

It is desirable that the blank be very accurately centered as its end is fed to the dies and also that it shall be steadied in its progress through the dies at all times and restrained against warping or bending by guiding means engaging it as it emerges from the pass. Therefore I provide guiding means on each side of the rotary dies. Specifically, I preferably provide the centering device shown in Fig. 3, arranged between the magazine and the die. Thus, mounted on the guide 41 is a vertical cylinder 50 that has a spring-pressed centering plunger 51 extending through it, the V-groove plunger head 52 and a V-shaped trough 41 both coacting with the blank in passage to the dies, and the plunger being depressed by a spring 53 coiled around it and acting between a shoulder on the plunger and the adjustable end nut 54 in the body 50. In this way the movement of the blank is constrained for most effective presentation to the die.

As to the leaving or emergent side of the die-pass, I preferably provide the additional guiding and centering devices for the blank in the form of a slide-carried guide-block 56 that is arranged for adjustment vertically and horizontally to locate it properly in line with the die-pass and that normally stands as close to the active area of the dies as is practicable so as to receive the leading end of the blank emerging from the dies and ride with the blank, to prevent its distortion. This block with its carriage or slide is guided along straight guide ways 57 of suitable length and so will move straight backward when it is impinged by the emergent end of the blank itself. The block 56 preferably has in it a recess 58 to receive the tube end and center it, such recess preferably having a movable bottom or ejector plug 59 normally pressed forward by a spring 60 and adjustable to limit its movement back into the block by a screw 61. The guides 57 may be suitably mounted, as upon the standards 30, and a weight 62 having a cable connection 63 that runs over pulley 64 and is attached to the carriage 65 for the slide block 56 serves normally to hold said block in blank-receptive position. To permit of the desired vertical and lateral adjustments of block 56 it is mounted for vertical movement in the dove-tail recess 66 of a holder 67, to be positioned therein between vertical adjusting screws 68, and said holder is feathered on a stud 69 that projects from the slide or carriage 65 there being a screw 70 in the holder abutting against the stud-end to set the position of the holder on the stud, and set-screws 71 (see Fig. 2ª) engaging the stud to hold such settings.

In operation the magazine is loaded with tapering tube blanks $a$ of requisite length, and for each turn of the main shaft 23 the lowest blank is fed forward, smaller end first, by feed-arm 45. Its forward end, accurately guided by the centering device 50, is fed to the small end of the groove in the rotary die, preferably substantially as the pitman for the feeding device is in dead-center position, so that the forward pressure of the feed-arm dominates only until the dies "bite," after which the dies positively drive the blank through the die-pass. The emergent smaller end of the blank encounters the guide block 56 and slips into the centering recess therein, compressing the ejecting spring 60, and then the guide block 56 travels with the blank, very positively guiding it and preventing it from warping or twisting. When the dies have completed their propulsion of the blank through the shaping pass, the finished blank, $a'$, relieved of the propelling pressure, is promptly ejected from the guide recess by the action of spring 60 and the block 56 is weight-returned to receptive position. Of course the shape of the finished article will depend on the die-contour and Figs. 11, 13 and 14 show various contours that I have commercially produced. It will be apparent that the machine is simple, rugged and may be rapidly operated; and further that dies of various shapes may be used on the machine and that the feed adjustment permits of accommodation of different blank lengths.

While I have herein described in some detail a specific embodiment of my invention for purposes of full disclosure, it will be understood that I do not restrict myself to the details set forth in the broader aspects of my invention, as many changes may be made in the specific embodiment within the spirit of my invention and within the scope of the appended claims.

I claim:

1. In a tubular-blank shaping machine, the combination of a pair of opposed rotary members having coacting arcuate die-portions on their peripheries, means to drive them, a blank magazine close to said members and having a bottom-slotted delivery trough; reciprocatory means below said trough extending into said trough through said slot for feeding blanks singly from said trough to said dies, and positive, direct driving connections from one said member to said feeding means positively synchronizing their operations.

2. In a tubular-blank ovaling machine, the combination of arcuate rotary dies, complementally grooved, a blank-magazine, a reciprocatory feed member for delivering blanks from the magazine to the dies, and adjustable-throw connection for driving said member in synchronism with the die operation.

3. In a tubular-blank-shaping machine, the combination of a pair of opposed arcuate rotary die members, means to drive them, a blank-magazine, reciprocatory feeding means for feeding blanks singly from said magazine to the dies, and a centering guide between the magazine and the dies comprising two parts relatively yieldable automatically to accommodate blanks of different diameters.

4. In a tubular-blank-shaping machine, the combination of arcuate rotary dies, complementally grooved, a blank magazine, a reciprocatory feed member for delivering blanks from the magazine to the dies, a slidable member arranged to be engaged by and movable with the blanks beyond the dies, and means for driving said dies.

5. In a tubular-blank-shaping machine, the combination of a pair of arcuate rotary dies, complementally grooved, means to drive them, a blank-magazine, reciprocating feeding means for feeding blanks from said magazine to the dies, fixed blank-centering means between the magazine and dies, and movable blank-centering means beyond the dies.

6. In a tubular-blank-shaping machine, the combination of a pair of opposed, arcuate rotary die members, complementally grooved, means to drive said dies, a centering guide aligning with the die-pass, in front of the dies; a centering guide member to receive the emergent blanks, aligning with the die-pass in rear of said dies.

7. In a tubular-blank-shaping machine, the combination of a pair of opposed rotary dies, a blank-magazine, a reciprocating feed member for delivering the blanks from the magazine to the dies, a slide block in rear of the dies aligning with the die-pass and movable rearwardly by and with an emergent blank, and return means for the block.

8. In a tubular-block-shaping machine, the combination of opposed rotary die members, means to drive them, a blank-magazine, means for feeding the blanks from said magazine to the dies, and in rear of the dies a slide block having a recess to be engaged by an emergent blank, an ejector spring associated with said recess, guide members for said slide block permitting it to move with the emergent blank, and return means for said block.

9. In a tubular-blank-shaping machine, the combination of opposed rotary die members, means to drive them including a main shaft, a blank-magazine, a reciprocable feeding arm associated with said magazine, a slotted crank on the main shaft and a pitman connected with said feed-arm and having adjustable wrist connection with said slotted crank.

10. In a tubular-blank-shaping machine, the combination of a pair of arcuate rotary dies, means to feed blanks thereto and movable blank-guiding means beyond the dies adjustable vertically and laterally in a plane transverse to the line of blank movement.

11. In a tubular-blank-shaping machine, the combination of opposed arcuate rotary dies, means to drive them, and a blank-guide-structure in rear of the die-pass comprising a slideway, a slide therein, a guide block carried by and vertically and laterally adjustable with respect to said slide and having provision for receiving the emergent end of a blank, and return means for the slide.

12. In a machine for shaping blanks, the combination of a pair of opposed rotary die members, means to drive them, a reciprocatory feeding means for feeding blanks singly to said dies, and means for driving said feeding means at a linear progression slower than the peripheral speed of said blanks.

13. In a machine for ovaling tubular blanks of circular section, the combination of a pair of opposed arcuate rotary die members, means to drive them in rotation, a reciprocatory feed member for delivering blanks to said dies, and means to drive said reciprocatory member adjustable to vary the linear progression of the feed member relatively to the peripheral speed of the dies.

CHARLES S. TILDEN.